Aug. 10, 1943.　　F. B. MacLAREN, JR　　2,326,239
ELECTROTHERMALLY OPERATED CIRCUIT CONTROLLER
Filed Nov. 5, 1940　　3 Sheets-Sheet 1

INVENTOR
*Frederick B. MacLaren Jr.*
BY *E. C. Sanborn*
ATTORNEY

Aug. 10, 1943.  F. B. MacLAREN, JR  2,326,239
ELECTROTHERMALLY OPERATED CIRCUIT CONTROLLER
Filed Nov. 5, 1940  3 Sheets-Sheet 2

INVENTOR
*Frederick B. MacLaren Jr.*
BY
*E. C. Sanborn*
ATTORNEY

Aug. 10, 1943.  F. B. MacLAREN, JR  2,326,239
ELECTROTHERMALLY OPERATED CIRCUIT CONTROLLER
Filed Nov. 5, 1940  3 Sheets-Sheet 3

INVENTOR
*Frederick B. MacLaren Jr.*
BY
*E. C. Sanborn*
ATTORNEY

Patented Aug. 10, 1943

2,326,239

UNITED STATES PATENT OFFICE 2,326,239

ELECTROTHERMALLY OPERATED CIRCUIT CONTROLLER

Frederick B. MacLaren, Jr., Waterbury, Conn., assignor to The Bristol Company, Waterbury, Conn., a corporation of Connecticut Application November 5, 1940, Serial No. 364,341

23 Claims. (Cl. 200—113)

This invention relates to switches or relays of the so-called electrothermally operated or "hot wire" type, and more especially to a relay of this class in which various shortcomings known to characterize such devices in earlier practice are eliminated.

By virtue of the fact that the heating of the thermal element in such a device varies as the square of the current flowing, such relays are inherently subject to burning out in the event of an abnormal current flow through the heating coil. In many such relays such an accident may result in the contacts closing or opening, in a sense to defeat the purpose of the relay, with consequent damage to controlled apparatus. While removal of atmospheric air from the heating element and contacts of relays of this class is generally looked upon as advantageous, it has been found that in some cases ionization of the residual gases due to arcing at the contacts has produced undesirable results. Furthermore, such relays frequently show a characteristic response to ambient temperature conditions, which seriously limits their application.

It is an object of this invention to provide a relay of the electrothermal type which in the event of damage to the electrical heating element will revert to the non-energized condition.

It is a further object to provide a relay of this type in which the movement of parts shall be limited with particular precision.

It is a further object to provide a relay of this type in which conditions of ambient temperature shall have a minimum effect on normal response of the relay.

It is a further object to provide in a relay of this type, suited for enclosure in an evacuated space, novel and improved means whereby the normal ionizing action of the contacts shall not produce destructive effects on the heating element.

Other features and advantages of the invention will be hereinafter described and claimed.

Figure 1:
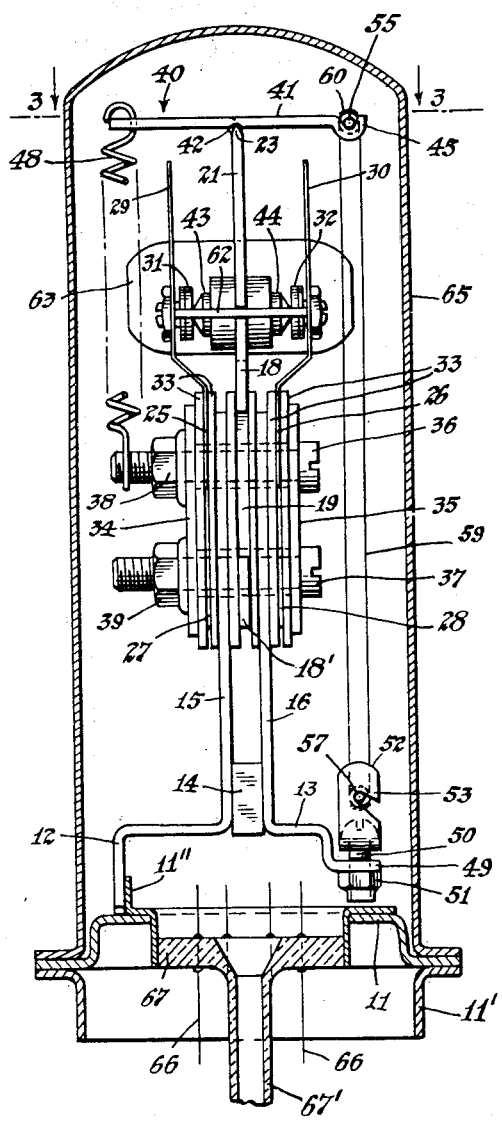
Fig. 1 is a vertical sectional view, with parts in elevation, illustrating an embodiment of my invention.

Referring to the drawings, a circular metal support 11 has mounted thereon a supporting member made up of two conformed metal plate members 12 and 13, welded to a spacing block 14, and having flat parallel projecting portions 15 and 16, with openings 17 formed therein, whereby said portions may readily be incorporated into a composite assembly as hereinafter described. The support 11 may, as shown, constitute a common type of header employed in vacuum tubes of the metal type.

A Y-shaped knife-edge member 18 formed of flat metal preferably having a low coefficient of expansion, as, for example, invar, is provided with a downwardly-projecting stem portion 19 adapted to be positioned between the portions 15 and 16 of the member 11, and having formed therein openings 20 similar in dimensions and spacing to the openings 17 in said projecting portions. Said member 18 is provided with upwardly projecting portions 21 and 22 lying in a plane with stem portion 19 and laterally displaced with respect to said stem portion. Said projections 21 and 22 terminate in knife-edges 23 and 24 in mutual alignment in said plane.

Contact supports 25 and 26, formed of resilient conducting material are provided with lower portions 27 and 28 formed and perforated in a manner similar to the portion 19 of member 18, and with offset portions 29 and 30, to which are fixed contact members 31 and 32, adapted to form elements in an electrical switching system. For reasons hereinafter to be set forth, the portions 29 and 30 are made of considerable area in a sense lateral to said contact members.

The projecting portions 15 and 16 of members 12 and 13, the stem portion 19 of member 18, and the portions 27 and 28 of the contact supports being interleaved as shown, and separated by suitable insulators 33, the whole is secured into a compact assembly by means of clamping plates 34 and 35 held in place by means of screws 36 and 37 passing therethrough, and engaging nuts 38 and 39. In the assembly thus formed, the several metal parts hereinbefore designated are securely held in fixed relationship, and mutually electrically insulated (except that the clamping plates and screws are not insulated from each other). It will, of course, be understood that insulating sleeves may be employed around the screws or bolts 37 and between the end plates 34, 35.

A rocker-plate 40, formed preferably of a single piece of sheet metal, comprises a substantially flat portion 41, and an arm portion 42 bent away therefrom and lying in a plane substantially perpendicular to that of said portion 41. Upon the lower side of the flat portion 41 are formed V-shaped grooves in alignment with each other and in substantial alignment with the intersection of said planes, adapted to engage the knife edges 23 and 24, whereby the plate 40 may rock upon the member 18, the arm portion 42 moving freely between the upwardly-projecting portions 21 and 22 of said knife-edge member. Secured to the arm portion 42 are oppositely extending contact members 43 and 44, positioned to coact alternatively with contact members 31 and 32 in functioning as a single-pole double-throw switch as the plate 40 is rocked through a small angle about its knife-edge mounting.

The flat portion 41 terminates at an extremity measured perpendicularly to the line of the knife edges in a pair of hook portions 45 and 46, the same being displaced and aligned in a sense paralleled to the line of the knife edges. At the extremity remote from said hook portions, there is provided a perforation 47, between which and a projecting part of the screw 36 is extended a tension spring 48.

Through a perforation formed in an extended portion 49 of the plate member 13 is passed a screw 50 engaging a nut 51, and serving to position a yoke 52 having hook portions 53 and 54 so that a line passing through said hook portions is substantially parallel to the line passing through hook portions 45 and 46 on plate 41, both lines lying in a plane substantially parallel to the plane of knife-edge member 18.

Supported between the hook members 45 and 46 is a rod 55 carrying a perforated cylindrical insulator 56 of ceramic material or the like; and supported between the hook members 53 and 54 is a similar rod 57 carrying a similar insulator, 58. Extended between the insulators 56 and 58 is a grid 59 formed of a winding of wire or ribbon formed of metallic material such, for example, as "Nichrome," having a substantial electrical resistance and a considerable temperature coefficient of linear expansion. This winding is maintained in tension by means of the spring 48 against which it acts through the plate 41 of the rocker arm 40; and the degree of tension may be regulated by adjustment of the nut 51 with respect to the screw 50. Each turn of the winding of the grid is secured to the insulators 56 and 58 by means of a pad of insulating cement 60, whereby, should any convolution become broken, the grid as a whole will not disintegrate, and, though electrically interrupted, will retain substantially its original mechanical strength and will continue to be maintained in a state of tension by the spring 48, so that its length remains unchanged.

Mortised into slots 61 formed in the edges of the portions 21 and 22 of the knife-edge member 18 are two flat spacers 62 of insulating material such as mica, these being held in place by means of resilient plates 63 of similar insulating material projecting perpendicularly away from the edges of the portions 21 and 22. Said plates are secured to the part 18 by means of metal clips 64 passing through openings in the plates and spot welded to the portions 21 and 22 of the part 18. The spacers 62 are so dimensioned and positioned that they serve to limit movement of the contact supports 25 and 26 toward the knife-edge member 18, thus defining the points in the excursion of the rocker plate 40 at which the contact members 43 and 44 will engage and disengage the contact members 31 and 32 respectively.

The whole assembly, as thus far described, is enclosed within an envelope 65 formed of gas-tight material, and sealed, as by welding to the header 11. While the material of the envelope 65 may be glass, it is preferred that metal be used for the purpose. When the envelope 65 is of metal, the relatively high thermal conductivity of the latter will permit a more rapid equalization of temperature surrounding the elements of the relay and thus make more consistent the response to ambient effects. The projecting resilient plates 63 are slightly deformed, and act as springs, bearing against the interior surface of the envelope 65, and serving to center the assembly therein and prevent displacement or vibration. Provision for connecting the enclosed parts of the device to external electrical circuits is made by conductors 66 insulated from one another and attached to the various elements of the device, and carried through an insulating seal 67 to suitable external terminals 68. These terminals may expediently be disposed according to any desired one of various conventional or standardized arrangements rendering the device suitable for use in a conventional radio socket. Thus, in Figure 2, the support or header 11 is mounted upon, and welded or sealed in any suitable manner to, a conventional annular metal skirt 11' to which may be secured in the customary manner a base 69 carrying the terminals 68. In the example illustrated, two of said conductors 66 are shown connected (Figure 2) to the grid 59; two others to a transverse extension 18' of the knife-edge member 18, and thence through the plate 40 to the contacts 43, 44; two others to the plate 25 which supports contact 31; and the remaining two to the plate 26 which supports the contact 32. While only five wires 66 need be employed in the embodiment illustrated (two for the grid 59, and one each connected to the respective extension 18', plate 25, and plate 26), the employment of eight wires provides the advantage of two conductors in parallel for each of the respective contact support members 18, 25, and 26. Either a standard five-terminal base 69 or a standard eight-terminal base may be employed, whether five or eight conductors are utilized.

Depending from the insulating seal 67, which may be of glass, is a tube 67' through which air may be evacuated from the space within the casing 65; said tube 67' being fused at its lower end to seal the evacuated interior of said casing in the customary way.

Figure 2:
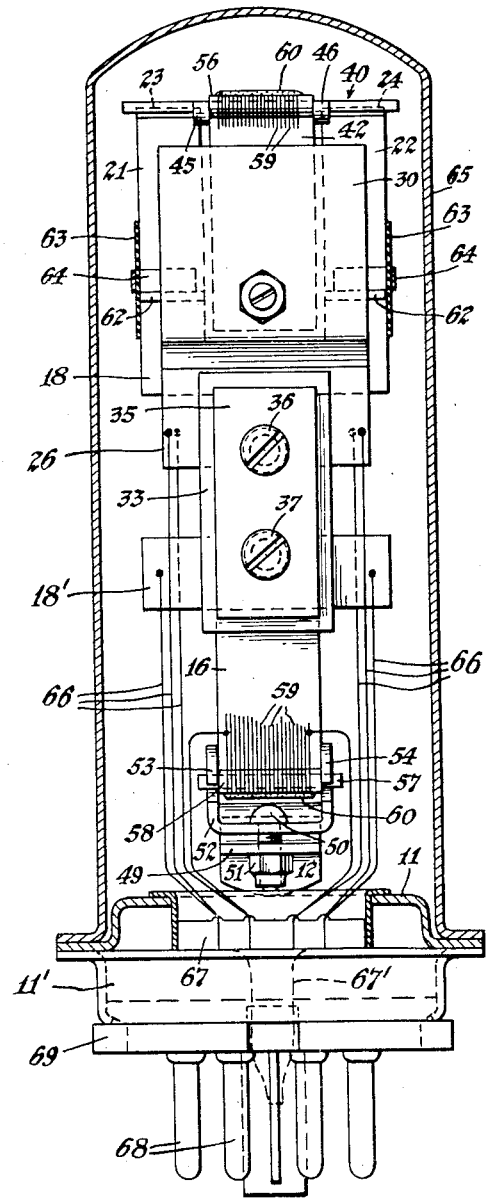
Fig. 2 is a side elevational view of said embodiment, with the enclosing casing and a portion of the base in vertical section.
Figure 3:
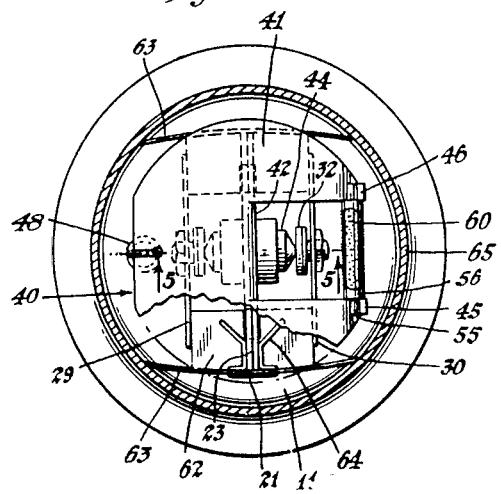
Fig. 3 is a horizontal sectional view on line 3—3 of Fig. 1, with parts broken away.
Figure 4:
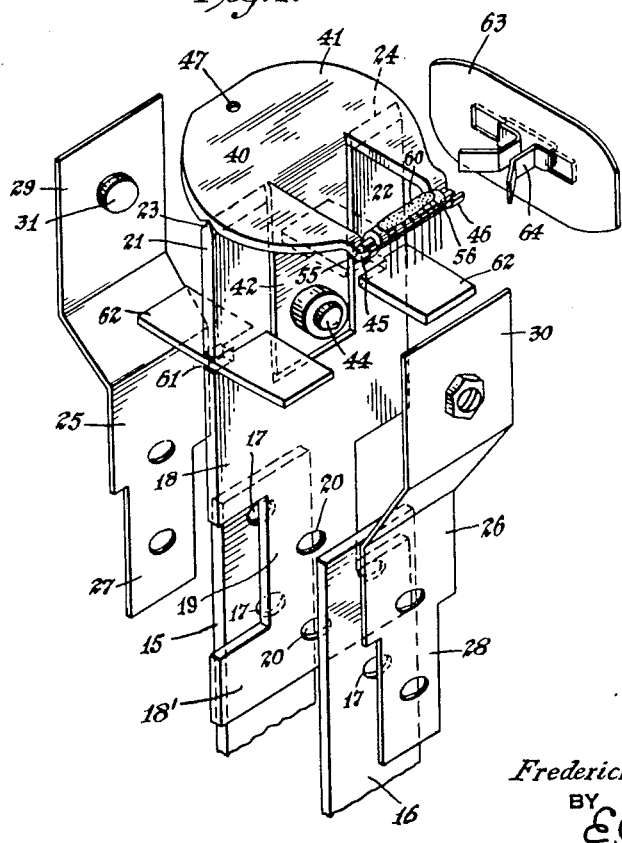
Fig. 4 is an exploded isometric view of the upper portion of the relay mechanism illustrated in Fig. 1.
Figure 5:
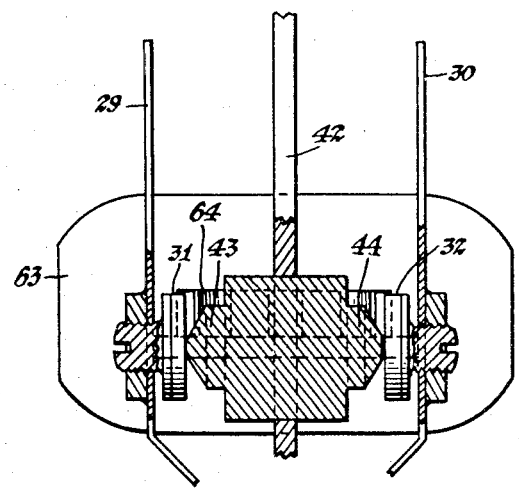
Fig. 5 is a vertical sectional view on line 5—5 of Fig 3.

The relay assembly may, as shown, be advantageously supported from the header 11 through the lower end of the supporting member 12, which is preferably slightly rounded, as illustrated in Figures 1 and 2. Said supporting member 12 is welded to a metal ear 11'' projecting upwardly from the header 11. At the same time, it will be observed that the supporting member 13 and nut 51 do not engage the header 11, so that the support of the structure from the header is through the lower end of member 12 and the metal ear 11''. When the casing 65 is applied to the assembly, it is engaged by the resilient insulating plates 63 which center the contact assembly within the casing 65, this action being assisted by the fact that said assembly is supported only through the member 12 and the ear 11″ from the header 11. Said ear 11″ is sufficiently resilient to enable the supporting element 12 and associated structure mounted thereon to readily adjust itself within the shell 65, and in centered relation thereto. In this way the centering of the contact assembly within the shell or casing is accomplished without disturbance of the tension of the grid 59 between the supports 55 and 57.

For purposes of maintained operation with optimum performance, the envelope 65 is evacuated or is filled with an inert gas at a suitable pressure.

While the relay as described is structurally such as to provide a single-pole double-throw contact combination, it is possible by adjustment of contact spacings before enclosing the mechanism in its envelope for evacuation to establish the performance with respect to whether one side of the switch will open before the other closes or both sides will be simultaneously closed as the rocker-plate passes through its intermediate position. Where a plain circuit-opening or circuit-closing action is desired without the double-throw feature this is accomplished of course by leaving the superfluous external terminal disconnected.

The relay is normally adjusted so that with all parts at the same temperature the spring 48 acting against the tension of the grid 59 maintains the rocker-plate 40 in a position where the contact members 31 and 43 are in engagement, and the circuit interrupted between contact members 32 and 44. Upon the passage of electric current through the conductors constituting the grid 59, heat is developed in said conductors; and the rise in temperature of the conductors causes a uniform expansion of the grid, allowing the spring 48 to deflect the rocker-plate 40 through a small angle in a counter-clockwise sense as seen in Fig. 1 about the knife-edge bearing, opening the left-hand contacts 31 and 43, and closing the right-hand contacts 32 and 44. Upon interruption of current flow in the grid, the latter will cool, contract, and, overcoming the tension of the spring 48, return the contact system to its original condition.

The insulating spacers 62, secured to the part 18 provide definite abutments for the contact mountings 29 and 30, and permit the latter to be given a set tending to spring them toward the center of the structure. Thus, though the stationary contacts are free to yield upon the engagement by the moving element, and thus prevent undesirable strains in the mechanism, yet these contacts at all time of open circuit are definitely positioned with respect to the moving contacts, thus establishing the point at which engagement takes place.

Figure 6:
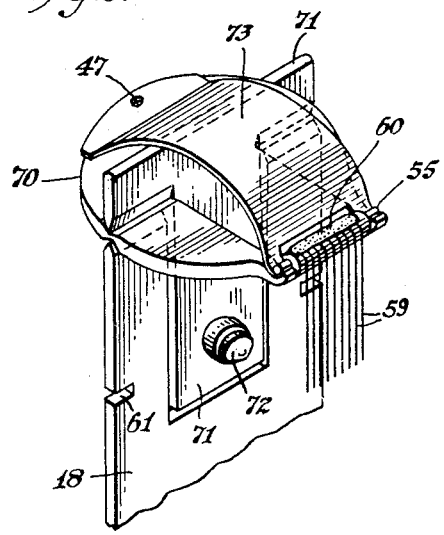
Fig. 6 is a detail view illustrating a modification.

In Fig. 6 is shown a modified form of the contact-actuating mechanism, as used in conjunction with the elements shown in the previous figures. Mounted upon the bifurcated knife-edge support 18 is a flat metal plate 70, generally similar to the portion 41 of the rocker-plate 40 in the previously shown embodiment of the device. The plate 70 has formed on both its upper and lower faces V-grooves adapted to serve as knife-edge bearings; and the lower of these grooves operatively engages the knife-edge of support 18 to form such a bearing therewith. Resting in the upper V-groove of the plate 70 is a T-shaped contact-carrying member 71, having knife-edges formed on the lower part of the cross-bar, thus providing a knife-edge bearing on the plate 70, whereby said member 71 may rock freely thereon. The downwardly projecting part of the T-shaped member 71 carries contact members 72 similar in all respects to the corresponding members 43 and 44 in the previously described embodiment of the invention and adapted to coact in a manner identical therewith with normally stationary contacts, such as the contacts 31 and 32 in Fig. 1. A resilient metal metal plate 73 secured at one of its extremities to the plate 70 by the tension of the spring 48, and at its other extremity to the rocker-plate by being clamped under the rod 55, is shaped to a bowed conformation and frictionally engages the upper edge of the member 71 in a manner to clamp the same into the knife-edge bearing on the upper side of the plate 70, and yet allow said last named member to rock upon said plate under pressure. Thus, as the plate 70 is rocked about its knife-edge bearing in the normal operation of the mechanism, the contact plate 71 will rock with it; but upon extreme deflection of the plate 70 in either direction, owing to increased expansion or contraction of the actuating grid, movement of the plate 71 may be stopped by engagement of the contacts, whereupon the plate 73 will slide along the upper edge of the plate 71, causing the same to assume a new position relatively to plate 70, and, while changing the setting, or operating point, of the relay, maintaining its sensitivity at its original and normal value.

Among the advantageous features of the invention there may be noted the following:

(1) The sealing of the grid wires 59 to the insulators 56 and 58 as above described, serves to secure each conductor individually to said insulators and to prevent slippage, should one of the convolutions become broken. Thus, in the event of a break in the grid, instead of the whole grid structure disintegrating as has characterized similar relays in the prior art, and the spring pulling the contacts to a condition corresponding to a heated grid, or the contact assembly simply falling apart, the interruption of current due to the break will allow the grid to cool, and the remaining conductors remaining secured to the insulators, the mechanical strength and characteristics of the grid will be but little changed, so that the contraction of the wires will cause the contacts to perform in a normal manner corresponding to an interruption of current in the heater circuit.

(2) The arcing, however slight, that may take place upon the breaking of an electrical circuit between contacts in a gas at a low pressure has a tendency to set up a certain degree of ionization in the neighborhood of those contacts; and this may result in an undesirable flow of electrons and ions to other conductors in the same space. While an insulating shield surrounding the contacts has been known to alleviate this condition to some extent, the more effective way is found in the provision of the contact supporting plates 29 and 30, which constitute substantial conducting barriers electrically connected to the controlled circuits. As a result, any electrons which may be set free upon separation of the contacts will flow to one or both of the extensive conducting plates to which the contacts are attached, and ionization is thus confined to the immediate vicinity of the contacts where it cannot reach the conductors of the grid and produce deterioration of the fine wires and possible flash-over within the envelope.

(3) Provision of a frictional relationship between the contact-carrying member and the actuating means, as shown in Figure 6, renders the relay especially suitable for use in circuits where there is desired a response based upon direction of change in the operating current. At the same time, with this arrangement, the time required to make or break contact upon energization or deenergization of the grid will be greatly decreased, since the motion of the contacts with respect to time is a substantially logarithmic relation following energization or deenergization of the grid.

It is desirable to maintain the operating current (i. e., the current in the grid 59 requisite for engaging contacts 44 and 32) at a constant value throughout a wide range of ambient temperature. The temperature of the grid with said operating current flowing through it is very high in comparison with ambient temperature. Change in ambient temperature affects the grid 59 to a far less extent than it affects the supporting structure for said grid. This will be particularly clear when it is borne in mind that the space within the shell 65 is substantially evacuated, that the insulators 56, 58 substantially prevent transfer of heat by conduction between the grid and supporting structure, and that practically the only way in which heat can be transferred between said grid and supporting structure is by radiation. Since the temperature of the grid when the operating current is flowing therein is far above ambient temperature, and since the quantity of heat transferred by radiation is proportional to the difference between the fourth powers of the absolute temperatures of the objects between which the radiation occurs, it will be seen that a change in ambient temperature affects the temperature of the supporting structure to a much greater extent than it affects the temperature of the grid. Indeed, the effect of a change in ambient temperature upon the grid is negligible as compared to the effect of such change upon the temperature of the supporting structure. By making the supporting structure 15 and 18, or part thereof, of material having a low coefficient of expansion, changes in length of said supporting structure are greatly reduced, or substantially eliminated, thereby maintaining the operating current substantially constant notwithstanding pronounced variations in ambient temperature. I find that this result may be satisfactorily achieved, for example, by making the supporting member 18 of material having a low coefficient of expansion, such as invar. It will be noted, in this connection, that elongation of the support 18 tends to rock the plate 40 and contacts 43, 44 clockwise (Fig. 1) about the support 60 for the grid (the latter remaining at substantially constant length for the reasons above explained), as the result of which increased operating current would be required in the grid for engaging contacts 44 and 32. This is avoided by making the supporting member 18 of material such as invar, having a low expansion coefficient, as above specified; though, if desired, both the member 15 and member 18 may be made of material having a low expansion coefficient.

If desired, the hole in the bottom of the yoke 52 through which the screw 50 passes, may have an outwardly widened or flaring upper portion receiving a correspondingly flared surface on said screw immediately beneath the head thereof, whereby the yoke is afforded increased facility for assuming a position in which equalized tension is maintained in each of the grid wires.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a device adapted for operation by a structure comprising a plurality of expansible conductors electrically in series and mechanically in parallel, supporting means for said conductors and adherent means securing said conductors to said supporting means and adapted upon interruption of the electrical continuity of said conductors to maintain the mechanical continuity of said structure.

2. A circuit controlling device comprising contacts, means comprising a group of expansible conductors electrically in series and mechanically in parallel for controlling said contacts, supporting means for said contacts, and means attaching said conductors to said supporting means and normally unstressed, but adapted upon the interruption of said series arrangement to assume stresses for maintaining the mechanical continuity of said group despite interruption of its electrical continuity.

3. A circuit controlling device comprising contacts, spring means acting in a given direction for controlling engagement of said contacts, means comprising a group of expansible conductors electrically in series and mechanically in parallel for controlling the action of said spring means, and means for maintaining the mechanical continuity of said group despite interruption of its electrical continuity.

4. A circuit controlling device comprising contacts, means comprising a group of expansible conductors electrically in series and mechanically in parallel for controlling said contacts, supports for maintaining said conductors under tension, means connecting said supports to said contacts, and means for securing each of said conductors individually to said supports.

5. A circuit controlling device comprising contacts, spring means acting in a given direction for controlling engagement of said contacts, means comprising a group of expansible conductors electrically in series and mechanically in parallel for opposing the action of said spring means and for overcoming said spring means when less than a given current flows through said conductors, and means for maintaining the action of said group in opposition to said spring means despite breakage of one of the conductors of said group.

6. A circuit controlling device comprising contacts, means comprising a group of expansible conductors electrically in series and mechanically in parallel for controlling said contacts, an evacuated closed veseel enclosing said contacts and conductors, and means between said contacts and conductors and electrically connected to one of said contacts for preventing transfer of electrons between said conductors and said contacts.

7. A circuit controlling device comprising contacts, means comprising a group of expansible conductors electrically in series and mechanically in parallel for controlling said contacts, an evacuated closed vessel enclosing said contacts and conductors, and shielding means comprising a conducting member carrying one of said contacts and electrically connected thereto for preventing transfer of electrons between said conductors and said contacts.

8. A circuit controlling device comprising contacts, means comprising a group of expansible conductors electrically in series and mechanically in parallel for controlling said contacts, an evacuated closed vessel enclosing said contacts and conductors, and shielding means between said contacts and conductors for preventing transfer of electrons therebetween, said shielding means comprising resilient conducting means carrying one of said contacts and electrically connected thereto.

9. A circuit controlling device comprising contacts, means comprising a group of expansible conductors electrically in series and mechanically in parallel for controlling said contacts, an evacuated closed vessel enclosing said contacts and conductors, shielding means between said contacts and conductors for preventing transfer of electrons therebetween, said shielding means comprising resilient conducting means supporting one of said contacts and electrically connected thereto, and insulating means for limiting movement of said supporting means toward the other of said contacts.

10. A circuit controlling device comprising a contact, a movable member supporting said contact, a stationary member upon which said movable member is mounted, spring means connected to said movable member for urging the same in a given direction, means comprising a group of expansible conductors electrically in series and mechanically in parallel and connected to said movable member for controlling movements thereof, a second contact, shielding means for preventing transfer of electrons between said contacts and said conductors, said shielding means comprising resilient conducting means supporting said second contact and electrically connected thereto, an evacuated closed vessel enclosing said contacts, conductors, and supporting means, and insulating means carried by said stationary member and cooperating with said resilient supporting means for limiting movement of the latter toward said first contact.

11. A circuit controlling device comprising a contact, a movable member supporting said contact, a stationary member upon which said movable member is mounted, spring means connected to said movable member for urging the same in a given direction, means comprising a group of expansible conductors electrically in series and mechanically in parallel and connected to said movable member for controlling movements thereof, a second contact, resilient means supporting said second contact, and insulating means carried by said stationary member and cooperating with said resilient supporting means for limiting movement of the latter toward said first contact.

12. A circuit controlling device comprising contacts, means comprising a group of expansible conductors electrically in series and mechanically in parallel for controlling engagement of said contacts, means for maintaining mechanical continuity of said group despite interruption of the electrical continuity of said conductors, an evacuated closed vessel enclosing said contacts and conductors, and shielding means between said contacts and conductors for preventing transfer of electrons therebetween, said shielding means comprising a conducting member electrically connected to one of said contacts.

13. A circuit controlling device comprising contacts, means comprising a group of expansible conductors electrically in series and mechanically in parallel for controlling engagement of said contacts, means for maintaining mechanical continuity of said group despite interruption of the electrical continuity of said conductors, an evacuated closed vessel enclosing said contacts and conductors, and shielding means between said contacts and conductors for preventing transfer of electrons therebetween, said shielding means comprising a conducting member electrically connected to one of said contacts, said vessel being of thermal conducting material.

14. A circuit controlling device comprising a contact, a movable member supporting said contact, a stationary member upon which said movable member is mounted, spring means connected to said movable member for urging the same in a given direction, means comprising a group of expansible conductors electrically in series and mechanically in parallel and connected to said movable member for controlling movemetns thereof, a second contact, and means supporting said second contact, said stationary member being of material having a coefficient of expansion substantially less than that of said conductors.

15. A circuit controlling device comprising a stationary member having upwardly extending spaced bearing portions, a member movably mounted on said bearing portions and having a projection depending into a zone between said bearing portions, a contact carried by said projections, a second contact, means resiliently supporting said second contact, spring means acting upon a portion of said movable member for urging the first mentioned contact in a given direction, and electro-thermal responsive means acting upon another portion of said movable member in opposition to said spring means.

16. A circuit controlling device comprising a stationary member having upwardly extending spaced bearing portions, a member pivotally mounted on said bearing portions and having a slot therein, a second member pivotally mounted on said first member and having a projection depending therefrom through said slot into a zone between said bearing portions, a contact carried by said projection, resilient means pressing said second member against said first member in any of a series of pivotal positions of said second member with respect to said first member, a second contact, means resiliently supporting said second contact, spring means acting upon the first mentioned contact to urge the same in a given direction, and electro-thermal responsive means acting upon said first mentioned contact in the opposite direction.

17. A circuit controlling device comprising a stationary member having upwardly extending spaced bearing portions, a contact, means on said bearing portions movably supporting said contact, contacts on opposite sides of the first mentioned contact, means resiliently supporting the second mentioned contacts, spring means acting upon the first mentioned contact to urge the latter into engagement with one of the second mentioned contacts, and electro-thermal responsive means acting upon the first mentioned contact in opposition to said spring means and adapted under given thermal conditions to shift said first mentioned contact into engagement with the other of said second mentioned contacts.

18. A circuit controlling device comprising engageable contacts, means supporting said contacts, a housing for enclosing said contacts and said supporting means, resilient insulating means on said supporting means and engageable with the interior of said housing, and means mounting said supporting means for rocking movement to enable centering thereof within said housing.

19. A circuit controlling device comprising engageable contacts, an expansible member, and lost-motion means cooperating with said member for controlling engagement of said contacts in response to the direction of change of expansion of said member.

20. A circuit-controlling device comprising engageable contacts, current-responsive means, mechanism operatively relating said means and said contacts for affecting the engagement of the latter in response to changes in the value of current in the former, said mechanism including a friction element to modify the engagement of said contacts in response to the direction of change in said current value.

21. A circuit-controlling device comprising an expansive member, a movable element adapted for direct actuation by expansion of said member, a contact member, and a mechanical connection including frictionally yielding means for actuating said contact member from said movable element.

22. A circuit controlling device comprising engageable contacts, an expansive member, means movable in response to expansion and contraction of said member, means operable to produce engagement of said contacts, and means cooperating with the two first mentioned means to cause operation of said means for producing engagement of said contacts in response to movement of said movable means and for enabling continued movement of said movable means in the same direction following said engagement of said contacts.

23. A circuit-controlling device comprising engageable contacts, an expansible member, means for rendering the expansion of said member responsive to the flow of an electric current, and friction means cooperating with said contacts and said member for controlling engagement of said contacts in response to the direction of change of value of said current.

FREDERICK B. MacLAREN, Jr.